United States Patent [19]

Brown

[11] 3,909,434
[45] Sept. 30, 1975

[54] PHENOXY ORGANOSILICON COMPOUNDS AS DIELECTRIC FLUIDS

[75] Inventor: Paul L. Brown, Saginaw, Mich.

[73] Assignee: Dow Corning Corporation, Midland, Mich.

[22] Filed: Mar. 7, 1974

[21] Appl. No.: 449,125

[52] U.S. Cl............ 252/63.7; 260/448.8 R; 252/64; 174/110 S; 317/258
[51] Int. Cl.² ..................... H01B 3/18; H01B 7/00
[58] Field of Search .......... 252/63.7, 64; 174/110 S; 317/258; 260/448.8 R

[56] References Cited
UNITED STATES PATENTS
2,914,548  11/1959  Schroll................................ 252/63.7
3,260,904   7/1966  Booe................................... 252/63.7

Primary Examiner—John D. Welsh
Attorney, Agent, or Firm—Robert F. Fleming, Jr.

[57] ABSTRACT

Organosilicon compounds of the formula

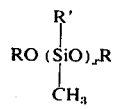

where $x$ is 1 to 30 and R is a phenyl or t-butylphenyl radical, are used as dielectric fluids in capacitors, transformers and other electrical devices. A specific compound is dimethyldiphenoxy silane which has a CIV of 3,100 volts and a CEV of 2,800 volts as measured over a gap of 1.4 mils.

8 Claims, No Drawings

PHENOXY ORGANOSILICON COMPOUNDS AS DIELECTRIC FLUIDS

With the ever increasing sophistication of electrical and electronic equipment, the various circuits are operating at higher and higher voltages. This means that dielectric fluids used in such apparatus are subjected to greater stress. As a result, it is very important that the dielectric have the quality known as self-healing so that when breakdown occurs due to a surge in the line, the insulating value of the dielectric will not drop below the operating voltage of the circuit. When a dielectric is placed under increasing stress, a point is reached where breakdown occurs. This voltage is known as the corona initiation voltage(CIV). Corona discharge will continue until the voltage is dropped to some point where corona ceases. This voltage is known as the corona extinction voltage (CEV). It is highly desirable that the CIV and CEV be as close together as possible.

The reason for this is that electrical apparatus are at times subjected to excessive voltage surges. These surges may well cause a breakdown in the insulation. However, when the surge passes and the voltage drops to normal operating levels, it is important that the apparatus continue to function. This will not happen, however, if the CEV is below the normal voltage level, for in this case the apparatus will short-out and be inoperative.

It has long been known that methylpolysiloxane fluids are excellent dielectric materials in that they have the property of good dielectric strength, high temperature and low temperature stability and other desirable properties. However, these materials suffer from one serious drawback; namely, that the CEV is quite low. For example, where the CIV of a low viscosity dimethylpolysiloxane is, say, 2,800 volts the CEV can be as low as 400 volts. This drop in insulating capacity precludes dimethylpolysiloxanes from use in many electrical devices such as capacitors or transformers which operate at high voltage.

It is also known that methylphenylpolysiloxane fluids have greater self-healing ability than do the corresponding methylpolysiloxanes. This is taught, for example, in German Patent Publication OLS 1,935,788 which discloses the use of phenylmethylpolysiloxane fluids of low viscosity as the dielectric material in capacitors. However, phenylmethylpolysiloxane fluids are much more expensive than dimethylpolysiloxane fluids. Hence, even though the phenyl fluids will operate under conditions where the methyl fluids will not, the higher cost of the former precludes their use for many applications.

It is the object of this invention to provide novel dielectric fluids which are in the same cost range as dimethylpolysiloxanes but which have CEV values equal to or better than the heretofore employed phenylmethylpolysiloxane fluids. Another object is to provide such fluids having the thermal stability and low gassing phenomena which is normally associated with phenylpolysiloxane fluids.

This invention relates to an electrical device having at least two electrodes and having between said electrodes a dielectric material consisting essentially of an organosilicon compound of the formula

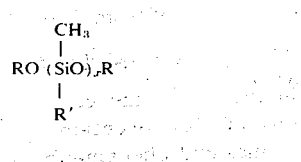

in which R is a phenyl or t-butylphenyl radical, R' is methyl or phenyl and $x$ is an integer from 1 to 30.

Thus, it can be seen that the dielectric fluids used in this invention can be silanes such as phenylmethyldiphenoxy silane, phenylmethyl-bis-t-butylphenoxy silane, phenylmethylphenoxy-t-butylphenoxy silane, dimethyldiphenoxy silane, dimethyl-bis-t-butylphenoxy silane and dimethylphenoxy-t-butylphenoxy silane or siloxanes of the

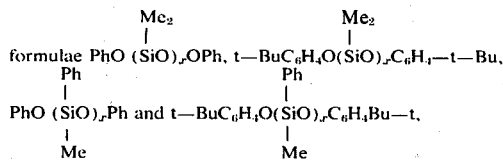

in which $x$ is an integer, for example, 2, 5, 10, 15, 20 or 30. It should be understood, of course, that the siloxanes can be pure species or mixtures of two or more species in which case $x$ is an average value. In these formulae and hereinafter, Ph is the phenyl radical, Me the methyl radical, and t-Bu is the tertiary butyl radical.

The silanes employed in this invention are best prepared by reacting the corresponding chlorosilanes with phenol or t-butyl phenol in the presence of a hydrogen halide acceptor such as ammonia or a tertiary amine. It is preferred that the reaction be carried out in an inert solvent such as toluene.

The siloxanes of this invention are best prepared by a series of reactions starting with the corresponding hydroxyl endblocked siloxane. For example

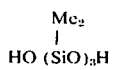

is reacted with acetic anhydride to give the corresponding acetoxy endblocked siloxane. This material is then reacted, preferably in an inert solvent such as toluene, with phenol or t-butyl phenol in the presence of an acid acceptor such as ammonia or tertiary amine. The reaction takes place, splitting out ammonium acetate or the amine acetate and giving the phenoxy endblocked siloxane.

In general, the above reactions are exothermic but if desired heating can be employed particularly with less reactive material such as t-butyl phenol. In order to assure the proper dielectric properties of the fluid it is essential that all ionic material such as ammonium chloride or unreacted phenol be removed. The fluids of this invention fall within the viscosity range of from 5 to 50 centistokes which make them ideal for impregnating capacitors and other electrical devices. They can also be used in transformers or in coaxial cables where a fluid dielectric is needed. The fluids of this invention are surprisingly stable toward hydrolysis, particularly in a pH range from 2.3 to 6.3. They also show little gassing during electrical discharges.

It should be understood that the compounds of this invention can be used in all the applications in which fluid dielectrics are used. They can be used alone or in conjunction with other dielectrics such as paper, plastic films, asbestos, mica and the like. They can also be used to improve the performance of methyl, phenyl or other siloxane fluids, rubbers or resins by incorporation therein either by way of solution or by impregnation. Such combinations are included within the term "consisting essentially of" employed in the claims.

The CIV and CEV data shown below were obtained on capacitors made in precisely the same way. This is necessary because the numerical values obtained vary with polyolefin films of different thickness and between films made by different manufacturers. All of the capacitors employed herein were of aluminum foil having therebetween two layers of 0.5 mil polypropylene film made by Hercules Incorporated and between each layer of the polypropylene film one layer of 0.4 mil electrical grade Kraft paper. This gave a total spacing between each turn of aluminum foil of 1.4 mils.

Each capacitor was impregnated as follows. The vacuum during the preheating and impregnating steps was maintained at about 5 microns of Hg. The capacitor was placed in a vacuum chamber for 4 days at 85°C. The temperature was lowered to room temperature and the fluid was introduced into the container. The capacitor was then allowed to stand for two hours or more before the vacuum was broken. It was then heated 24 to 48 hours at 85°C. It is believed the post impregnation heating step ensures impregnation of all the voids within the polypropylene film.

The following examples are illustrative only and should not be construed as limiting the invention which is properly delineated in the appended claims.

EXAMPLE 1

1500 ml. of toluene and 575 g. of phenol were azeotroped dry. There was then added under the surface of the solution 387 g. of dimethyldichlorosilane while ammonia was bubbled through the mixture. The reaction was exothermic and when the temperature had decreased the solution was washed to remove the ammonium chloride and stripped to remove the toluene. The product was distilled to give dimethyldiphenoxy silane, boiling 275° to 277°C. at 749 mm. and having a refractive index of 1.5307, a density of 1.0607 and a viscosity of 5.12 cs., all at 25°C.

EXAMPLE 2

Phenylmethyldiphenoxy silane was prepared from phenylmethyldichloro silane by the procedure of Example 1. The distilled product had the following properties: viscosity 19.6 cs., density 1.1126 and refractive index 1.5725, all at 25°C.

EXAMPLE 3

160 g. of para-t-butyl phenol and 200 ml. of toluene were azeotroped dry. The solution was held at 50°C. while ammonia was bubbled through and 65 g. of dimethyldichloro silane was added under the surface of the toluene solution. After addition was complete, the toluene was refluxed for one hour and the resulting product was washed free of ammonium chloride and distilled to give dimethyl-bis-p-t-butylphenoxy silane boiling at 253°C. at 40 mm.

EXAMPLE 4

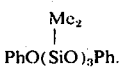

972 g. of $CH_3COO(SiO)_3OCCH_3$ was added to 500 ml. of toluene containing 629 g. of phenol while ammonia was being passed through the solution. After addition of the siloxane was complete, the ammonium acetate was washed from the solution and the solution was stripped free of toluene and excess phenol at a temperature of 130°C. at 0.5 mm. The residue was fractionated and the cuts boiling 0.1 mm. at 115°C. were used. This material had the formula

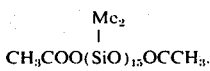

$PhO(SiO)_3Ph.$

EXAMPLE 5

The procedure of Example 4 was repeated except that the siloxane used had the formula

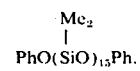

$CH_3COO(SiO)_{15}OCCH_3.$

The product was stripped on a rotating evaporator at 140°C. at one mm. to remove volatile materials. The stripped material was then heated in the presence of 2 percent calcium oxide at 150°C. for two hours to remove any SiOH groups. The resulting product was filtered and had the following properties: viscosity 17.4 cs., refractive index 1.4258 and density 0.986, all at 25°C. This material had the average formula $Me_2$
$PhO(SiO)_{15}Ph.$

EXAMPLE 6

150 g. of para-t-butyl phenol was mixed with 100 ml. of the dimethyl ether of ethylene glycol, 100 ml. of pyridine and 4.5 g. of water. To this mixture was added 112 g. of dimethyldichloro silane. The sample was cooled during addition of the dimethyldichloro silane. The pyridine hydrochloride was washed from the reaction mixture and the solvent and volatiles removed by heating at a temperature up to 172°C. at 1.8 mm. The residue was filtered and had a viscosity of 38.86 cs. and a refractive index of 1.4985 both at 25°C.

Analysis of the product by gas liquid chromotography showed the following materials were present: 66.4 percent of bis-para-t-butyl phenoxy dimethyl silane, and 33.6 percent siloxanes of the formula

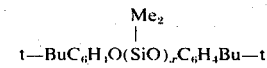

$t-BuC_6H_4O(SiO)_xC_6H_4Bu-t$ where $x$ had a value of from 2 to 10.

EXAMPLE 7

This example shows the corona resistance of the compositions of this invention in comparison with methyl siloxanes and phenylmethyl siloxanes. In each

| Compound | Vol. Res. ohm/cm. | DK 100 | DF 100 | DK 1000 | DF 1000 |
|---|---|---|---|---|---|
| Me$_2$<br>\|<br>PhO(SiO)$_{15}$Ph | 6.0 × 10$^{14}$ | 2.9457 | 0.00015 | 2.9457 | 0.00003 |
| Me$_2$Si(OPh)$_2$ | 3.4 × 10$^{12}$ | 3.4714 | 0.00286 | 3.4735 | 0.00042 |
| PhMeSi(OPh)$_2$ | 6.03 × 10$^{12}$ | 3.3385 | 0.00049 | 3.3385 | 0.00003 |
| Me$_2$Si(OC$_6$H$_4$—t—Bu)$_2$ | 2.5 × 10$^{13}$ | 2.867 | 0.000052 | 2.869 | 0.000035 |
| Mixture Example 6 | 5.34 × 10$^{12}$ | 2.9484 | 0.00173 | 2.9484 | 0.00019 | case the capacitors were constructed and impregnated as shown above.

| Compound | CIV | CEV | CEV/CIV |
|---|---|---|---|
| Me$_2$<br>\|<br>Me$_3$Si(OSi)$_x$OSiMe$_3$*<br>50 cs. viscosity | 2400 | 400 | 0.17 |
| Me$_2$<br>\|<br>Ph$_2$MeSiOSi-<br>OSiMePh$_2$* | 2400 | 1700 | 0.71 |
| PhSi(OSiMe$_3$)$_3$* | 2800 | 2000 | 0.71 |
| PhMeSi(OPh)$_2$ | 3100 | 2800 | 0.90 |
| Me$_2$Si(OPh)$_2$ | 3100 | 2800 | 0.90 |
| Me$_2$<br>\|<br>PhO(SiO)$_3$Ph | 2600 | 1900 | 0.73 |
| Me$_2$<br>\|<br>PhO(SiO)$_{15}$Ph | 2400 | 1000 | 0.42 |
| (p—t—BuC$_6$H$_4$O)$_2$-<br>SiMe$_2$ | 2300 | 1600 | 0.70 |

*For comparison only.

This data graphically illustrates the improvement obtained by the materials of this invention. Note that even when the phenoxy group is diluted out with as much as 15 dimethylsiloxane units, the performance is far superior to that of polydimethylsiloxane. Also note that the CEV/CIV ratios show that the compositions of this invention are equal or superior to phenylmethyl siloxanes.

EXAMPLE 8

The dielectric strength of the compositions was determined by taking the average value of from 10 to 15 breakdowns in an open cup using ASTM-D-877. By this procedure the compound

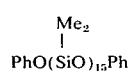

was shown to have a dielectric strength of 360 volts/mil based on an average of 10 tests. After one breakdown the voltage decreased to 230 volts/mil based on the average of 15 tests. This shows a self-healing of 64 percent* as compared to a self-healing ability of 30 to 40 percent for a comparable viscosity trimethyl endblocked dimethylpolysiloxane.

*(230/360) × 100

Using the test shown above, dimethyldiphenoxy silane has a self-healing ability of 100 percent (average 15 breakdowns). That is, there was no discernible decrease in dielectric strength after the initial breakdown.

EXAMPLE 9

Other electrical properties of the compositions of this invention are given in the table below.

EXAMPLE 10

This example indicates operability of the instant compounds in transformers as compared with other organosilicon compounds.

The cell consisted of a brass ground plate covered with a ten mil layer of transformer grade Kraft paper. A one inch thick "Teflon" cover with twelve ½ inch test holes was placed on the paper and the assembly was placed in a container and dried under a vacuum for 20 hours at 105°C. The fluid was then introduced under a vacuum of 1 to 10 microns of Hg. The sample is tested using a ½ inch ball electrode resting on the paper. The average voltage at breakdown for several shots is shown in the table below:

TABLE

| Compound | No. of Shots | Volts/Mil |
|---|---|---|
| Me$_2$<br>\|<br>Me$_3$SiO(SiO)$_x$SiMe$_3$*<br>10 cs. viscosity | 12 | 1579 |
| Me$_2$<br>\|<br>Me$_3$Si(OSi)$_x$OSiMe$_3$*<br>350 cs. viscosity | 12 | 1662 |
| Ph　　Me$_2$<br>\|　　\|<br>Me$_3$SiO(SiO)$_{3.2}$(SiO)$_{26.}$<br>$_6$SiMe$_3$*<br>500 cs. viscosity | 11 | 1719 |
| Me<br>\|<br>Ph<br>\|<br>Me$_3$SiO(SiO)$_{15.4}$SiMe$_3$*<br>\|<br>Me | 11 | 1864 |
| PhMeSi(OPh)$_2$ | 23 | 2618 |

*For comparison only.

That which is claimed is:
1. An article of manufacture consisting of an electrical device having at least two electrodes having between said electrodes a dielectric material consisting essentially of an organosilicon compound of the formula

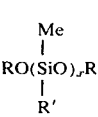

in which
R is phenyl or t-butylphenyl,
R' is methyl or phenyl, and
x is an integer from 1 to 30.
2. The article of claim 1 in which the electrical device is a capacitor.
3. The article of claim 1 in which the electrical device is a transformer.

4. The article of claim 1 in which the organosilicon compound is phenylmethyldiphenoxy silane.
5. The article of claim 1 in which the organosilicon compound is dimethyldiphenoxy silane.
6. The article of claim 1 in which the organosilicon compound has the formula
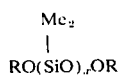
where $x$ is 2 to 30.
7. The article of claim 6 in which R is phenyl.
8. The article of claim 6 in which R is t-butylphenyl.
* * * * *